United States Patent
Wang

(10) Patent No.: US 8,948,818 B2
(45) Date of Patent: Feb. 3, 2015

(54) INFORMATION DISPLAY METHOD FOR A PORTABLE DEVICE IN A STANDBY SITUATION

(75) Inventor: Yi-Hua Wang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 733 days.

(21) Appl. No.: 12/332,296

(22) Filed: Dec. 10, 2008

(65) Prior Publication Data

US 2009/0156173 A1 Jun. 18, 2009

(30) Foreign Application Priority Data

Dec. 14, 2007 (TW) ................................ 96147949 A

(51) Int. Cl.
*H04M 1/00* (2006.01)
*G06F 3/048* (2013.01)
*H04M 1/725* (2006.01)
*H04M 1/57* (2006.01)

(52) U.S. Cl.
CPC ........... *G06F 3/048* (2013.01); *H04M 1/72522* (2013.01); *H04M 1/72597* (2013.01); *H04M 1/576* (2013.01); *H04M 1/72552* (2013.01); *H04M 1/72566* (2013.01)
USPC ....................................... 455/566; 455/412.2

(58) Field of Classification Search
CPC ..................... H04M 1/72519; H04M 1/72522; H04M 1/72544; H04M 1/72566; H04M 1/72583; H04M 2250/16; H04M 1/72552; H04M 1/72563; H04M 2201/38; H04W 52/027; H04N 1/00307; H04N 21/4438; G11B 19/025
USPC ......... 715/300–340, 744, 763, 705, 762, 864, 715/803, 781; 455/566, 412.2, 455/575.1–575.5, 457, 550.1; 340/7.51; 345/156, 169, 158, 173
See application file for complete search history.

(56) References Cited

U.S. PATENT DOCUMENTS

| | | | |
|---|---|---|---|
| 6,456,841 B1 * | 9/2002 | Tomimori | 455/412.2 |
| 6,903,743 B2 | 6/2005 | Ng | |
| 7,221,937 B2 | 5/2007 | Lau et al. | |
| 2002/0094846 A1 * | 7/2002 | Kishimoto et al. | 455/566 |
| 2004/0198457 A1 * | 10/2004 | Hayashida et al. | 455/566 |
| 2005/0111645 A1 * | 5/2005 | Aoyama et al. | 379/142.06 |
| 2006/0172779 A1 * | 8/2006 | Yoshida | 455/567 |

(Continued)

FOREIGN PATENT DOCUMENTS

| | | |
|---|---|---|
| CN | 101014170 | 8/2007 |
| EP | 1043905 | 10/2000 |
| EP | 1650937 | 4/2006 |
| EP | 1850287 | 10/2007 |

OTHER PUBLICATIONS

"Search Report of European counterpart application", issued on Aug. 7, 2009, p. 1-p. 8.

(Continued)

*Primary Examiner* — Golam Sorowar
(74) *Attorney, Agent, or Firm* — Jianq Chyun IP Office

(57) ABSTRACT

A method for displaying an information is provided. The method is suitable for a portable device in a standby situation, wherein a display unit of the portable device displays a standby layout. In the present method, at least one event is generated, and then, the standby layout is changed to add a movable field in a visible region of the display unit, wherein the movable field displays the event.

13 Claims, 4 Drawing Sheets

(56) References Cited

U.S. PATENT DOCUMENTS

| | | |
|---|---|---|
| 2006/0232573 A1 | 10/2006 | Nitta et al. |
| 2006/0290661 A1 | 12/2006 | Innanen et al. |
| 2007/0018957 A1* | 1/2007 | Seo .............................. 345/156 |
| 2007/0077970 A1* | 4/2007 | Um et al. ...................... 455/566 |
| 2007/0103560 A1* | 5/2007 | Suga et al. ............... 348/211.99 |
| 2008/0122796 A1* | 5/2008 | Jobs et al. .................... 345/173 |
| 2008/0165022 A1* | 7/2008 | Herz et al. ................... 340/669 |
| 2008/0272986 A1* | 11/2008 | Lee ................................ 345/55 |

OTHER PUBLICATIONS

"First Office Action of China Counterpart Application", issued on Nov. 12, 2010, p. 1-p. 5, in which CN101014170 was cited.

"Office Action of Taiwan Counterpart Application", issued on Feb. 18, 2011, p. 1-p. 7, in which US7221937, US20060232573, US20060290661 were cited.

* cited by examiner

INFORMATION DISPLAY METHOD FOR A PORTABLE DEVICE IN A STANDBY SITUATION

CROSS-REFERENCE TO RELATED APPLICATION

This application claims the priority benefit of Taiwan application serial no. 96147949, filed on Dec. 14, 2007. The entirety of the above-mentioned patent application is hereby incorporated by reference herein and made a part of this specification.

BACKGROUND OF THE INVENTION

1. Field of the Invention

The present invention generally relates to an information display method, and more particularly, to an information display method for a portable device in a standby situation.

2. Description of Related Art

Along with the advancement of communication techniques, the functions of cell phones and personal digital assistants (PDA) with communication functions have been diversified. Besides providing simple communication functions, a cell phone or a PDA can also store missed calls and receive short messages when it is not convenient for the user (for example, when the user is attending a meeting). In addition, the operating system of a cell phone or a PDA also allows the user to establish a personal calendar so that the user can input important notes and events for each day, and the operating system issues a message at a proper time to remind the user of an upcoming event according to the personal calendar established by the user.

Generally speaking, if a missed call or a short message is received or an event reminder is issued when a cell phone or a PDA is in a standby situation, the user needs to browse all the messages. In this case, the user has to manually switch the cell phone or PDA from the standby situation to a working situation, or the user may even have to unlock the screen through a series of key operations, to browse all the messages. Accordingly, it is made very inconvenient for the user to use the cell phone or PDA, and the user may neglect some important event reminders. Even some cell phone or PDA can display missed calls, short messages, or event reminders in a specific field of a display unit when the cell phone or PDA is in the standby situation, the arrangement of the specific field in the display unit is not very obvious and the user is not instantly aware of the newly received message or event reminder. Thus, the user has to actively check the specific field for any change to be aware of the newly received message or event reminder.

SUMMARY OF THE INVENTION

Accordingly, the present invention is directed to an information display method, wherein a visual variation is produced by changing a standby layout so that a user can get to know about an event without performing any unlocking operation.

The present invention is further directed to an information display method, wherein a user is explicitly and conveniently reminded of an event when a portable device is in a standby situation.

The present invention provides an information display method suitable for a portable device in a standby situation, wherein the portable device has a display unit which displays a standby layout. In the information display method, at least one event is generated, and then the standby layout is changed to add a movable field in a visible region of the display unit, wherein the movable field displays the event.

According to an embodiment of the present invention, in the information display method, the event includes a missed call, a short message, and an event reminder.

According to an embodiment of the present invention, in the information display method, a display position of the movable field is changed in the visible region of the display unit every time when the event is generated in the standby situation.

According to an embodiment of the present invention, in the information display method, a relative position between the movable field and the main menu is changed in the visible region of the display unit every time when the event is generated in the standby situation.

According to an embodiment of the present invention, in the information display method, the movable field includes at least one sub field for sequentially displaying the event according to a priority sequence.

According to an embodiment of the present invention, in the information display method, the step of changing the standby layout further includes generating a sensory signal, wherein the sensory signal includes a change in the screen backlight, a change in the color presentation of the main menu, an audio signal, and a vibration signal.

According to an embodiment of the present invention, in the information display method, the display unit is a touch screen.

According to an embodiment of the present invention, in the information display method, the portable device is one of a smartphone, a personal digital assistant (PDA), a PDA phone, and a touch phone.

The present invention further provides an information display method suitable for a portable device in a standby situation, wherein the portable device has a display unit which displays a main menu for representing the standby situation. In the information display method, at least one event is generated, and then, the main menu is moved within a visible region of the display unit, and a movable field is generated around the main menu, wherein the movable field displays the event.

According to an embodiment of the present invention, in the information display method, the event includes a missed call, a short message, and an event reminder.

According to an embodiment of the present invention, in the information display method, the movable field is moved within a visible region of the display unit every time when the event is generated in the standby situation.

According to an embodiment of the present invention, in the information display method, a relative position between the movable field and the main menu is changed in a visible region of the display unit every time when the event is generated in the standby situation.

According to an embodiment of the present invention, in the information display method, the movable field includes at least one sub field for sequentially displaying the event according to a priority sequence.

According to an embodiment of the present invention, in the information display method, the step of moving the main menu further includes changing a content, a shape, or a color presentation of a picture displayed by the main menu.

According to an embodiment of the present invention, in the information display method, the display unit is a touch screen.

According to an embodiment of the present invention, in the information display method, the portable device is one of a smartphone, a PDA, a PDA phone, and a touch phone.

In the present invention, when a portable device is in a standby situation, any missed call, received short message, and event reminder issued by the operating system of the portable device according to a pre-established schedule are displayed as events in a movable field within a visible region of a display unit. Thus, a user can get to know about these events without having to unlock the display unit or switch the portable device from the standby situation to a working situation. In addition, when a event is generated, a user is visually alarmed of the event through a change in the main menu (for example, by moving the main menu, changing the color presentation, content, or shape of a picture of the main menu, or changing a relative position between the main menu and the movable field). Accordingly, the user can get a convenient and explicit event reminder without having to unlock the display unit or switching the portable device form the standby situation to a working situation. Thereby, the information display method in the present invention improves the convenience and adaptability of the portable device.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
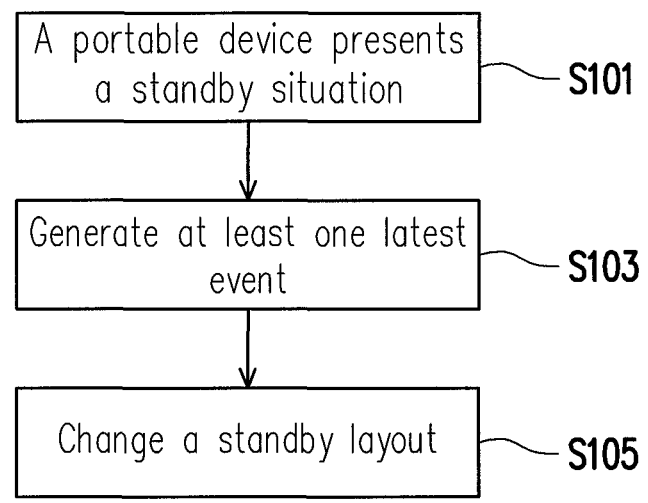
FIG. 1 is a flowchart of an information display method according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
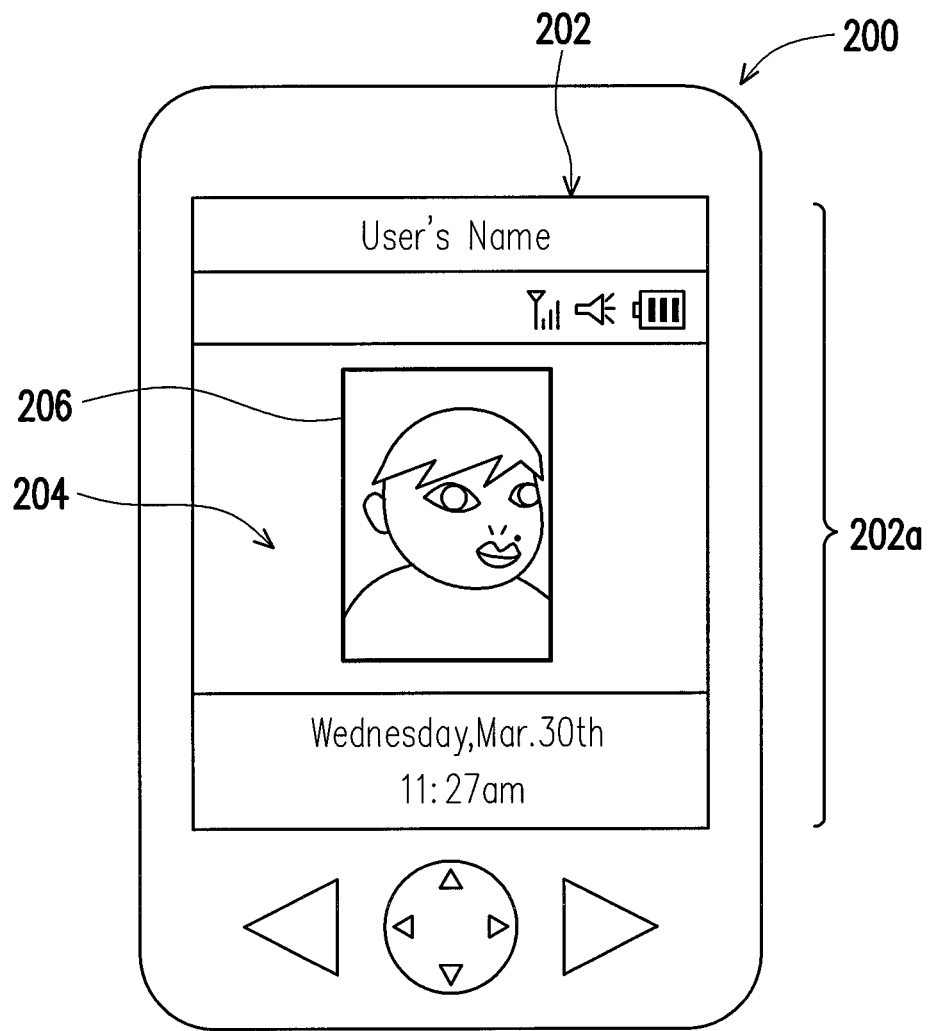
FIGS. 2A~2C are diagrams of an information display method according to an embodiment of the present invention.
Figure 2B:
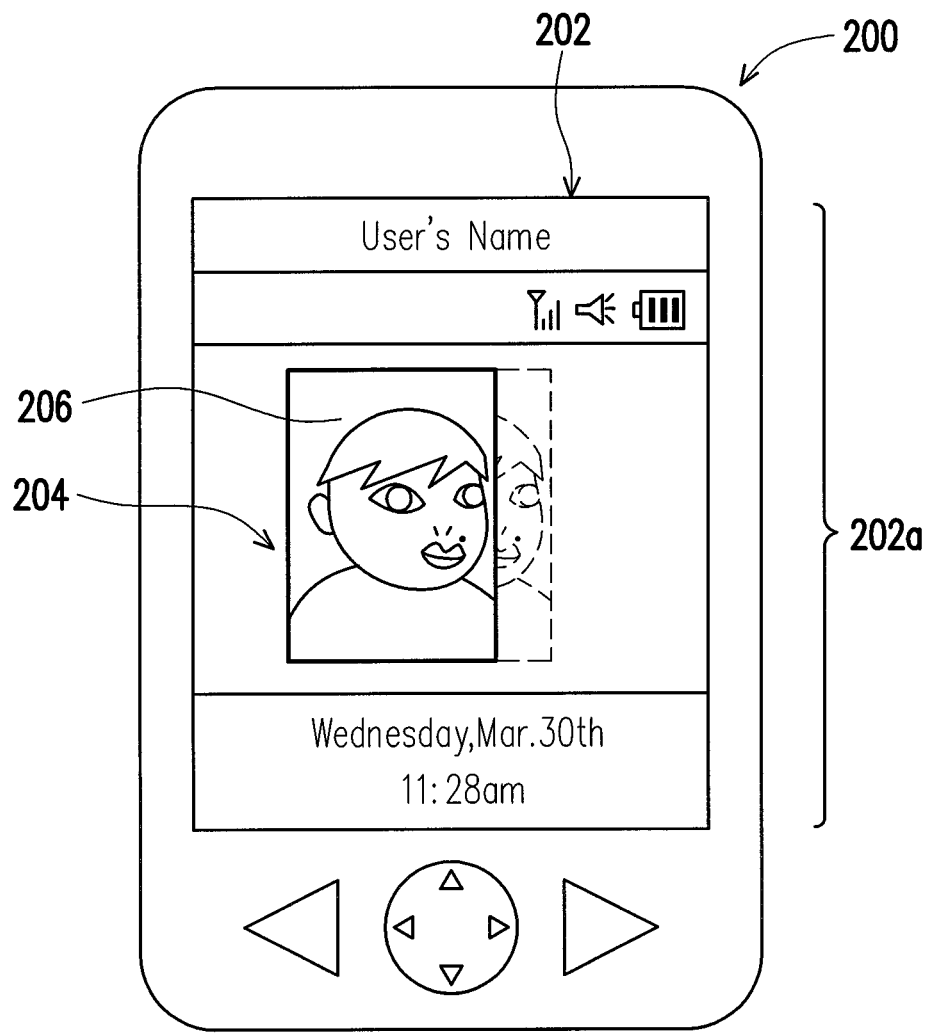
Figure 2C:
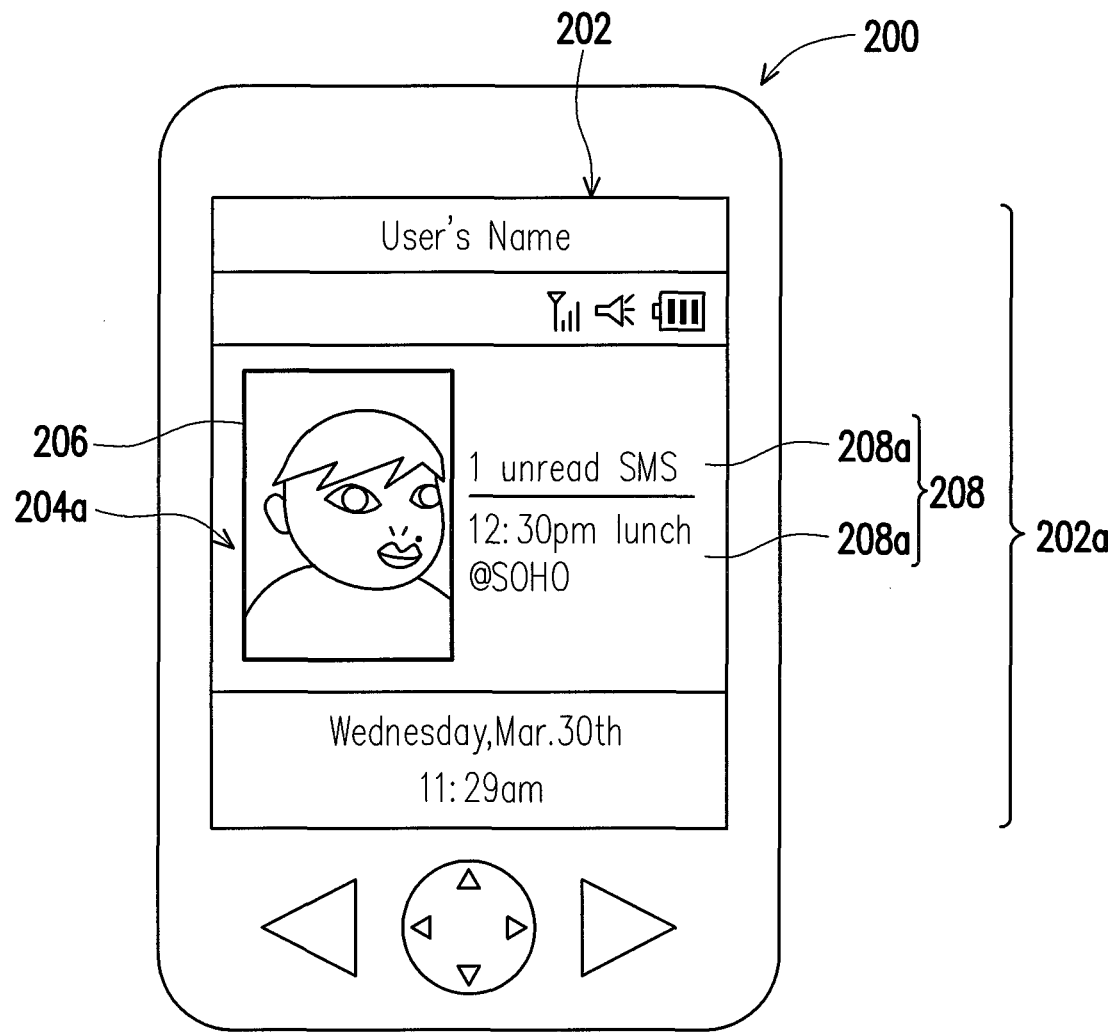

FIG. 1 is a flowchart of an information display method according to an embodiment of the present invention. FIGS. 2A~2C are diagrams of an information display method according to an embodiment of the present invention. Referring to FIG. 1 and FIG. 2A, in step S101, a portable device 200 presents a standby situation, wherein the portable device 200 may be a smartphone, a personal digital assistant (PDA), a PDA phone, or a touch phone, and the standby situation refers to an operation mode or a screen locked mode in which the portable device 200 remains turned on and connected.

The portable device 200 has a display unit 202 for displaying a standby layout 204, wherein the display unit 202 may be a touch screen. The standby layout 204 includes a main menu 206 when the portable device 200 is in the standby situation. Namely, the portable device 200 is in the standby situation when the main menu 206 is displayed. In FIG. 2A, the main menu 206 is presented as a quadrangular picture and disposed in a center area of a visible region 202a of the display unit 202. However, in the present invention, the shape, presentation, and disposition of the main menu are not limited to the quadrangular picture. Namely, the main menu may be in any polygonal shape, and the main menu may also be a screen background image, a text, or a color block other than a picture. Moreover, when the main menu 206 is, as shown in FIG. 2A, a picture, the main menu 206 may also be disposed at any place within the visible region 202a of the display unit 202.

Next, referring to FIG. 1 and FIG. 2B, in step S103, at least one event is generated in the portable device 200. The event may be a missed call, a short message, or an event reminder, wherein the event reminder includes a task reminder, a conference reminder, or an interview reminder issued by an operating system of the portable device 200 according to a schedule pre-established by a user.

After the event is generated (step S103), in step S105, the standby layout 204 is changed (as shown in FIG. 2B) to add a movable field 208 in the visible region 202a of the display unit 202 (as shown in FIG. 2C), wherein the main menu 206 and the movable field 208 coexist in the visible region 202a. The standby layout 204 may be changed into the standby layout 204a to add the movable field 208 by moving the main menu 206 (referring to FIG. 2B) and disposing the movable field 208 around the main menu 206. Namely, as shown in FIG. 2C, when the main menu 206 is moved toward one side of the visible region 202a of the display unit 202, the movable field 208 is added at the other side of the visible region 202a. In an embodiment of the present invention, the step of moving the main menu 206 further includes changing the content, shape, and color presentation of the picture displayed by the main menu.

In addition, the movable field 208 displays the event. The movable field 208 may only display the type of the event or display part of the content of the event. Besides, the movable field 208 further includes at least one sub field 208a for sequentially displaying a plurality of events according to a priority sequence preset by the user. The priority sequence of the events may be determined according to the occurrence time of the events or the significances thereof. The method of displaying the events according to the priority sequence includes displaying a dynamic caption in large font, bold font, high contrast color, and flashing effect or displaying the event having the highest priority at the top field of the sub field 208a.

In an embodiment of the present invention, in the standby situation, the display position of the movable field 208 is changed in the visible region 202a of the display unit 202 every time when an event is generated. Namely, every time when a event is generated, besides displaying the event in the movable field 208, a displacement of the movable field 208 is further generated in the visible region 202a of the display unit 202 to change the display position of the movable field 208.

In another embodiment of the present invention, the relative position between the movable field 208 and the main menu 206 is changed in the visible region 202a of the display unit 202 every time when an event is generated. Namely, every time when an event is generated, a relative displacement between the movable field 208 and the main menu 206 is further generated in the visible region 202a of the display unit 202 besides displaying the event in the movable field 208.

Moreover, besides reminding the user through visual change produced by changing the standby layout every time when an event is generated, a sensory signal may be further generated to enhance the reminding effect. The sensory signal includes a change in the screen backlight, a change in the color presentation of the main menu, an audio signal, and a vibration signal.

As described above, in the present invention, when a portable device presents a standby situation while the operating system thereof works normally and still receives communication messages, missed calls, received short messages, and event reminders issued by the operating system of the portable device are all displayed as events within a visible region of a display unit. Thus, a user can get to know about the events from a movable field added for displaying the events without having to unlock the display unit or switch the portable device from the standby situation to a working situation. Moreover, when an event is generated, the main menu is changed (for example, by moving the main menu, changing the content, the shape, or the color presentation of a picture displayed by the main menu, or changing the relative displacement between the main menu and the movable field) so that the user can be visually alarmed of any change in the standby image displayed in the display unit and accordingly get to know about the occurrence of the event. Thus, the user can get convenient and explicit event reminders without having to unlock the display unit, switching the portable device from the standby situation to the working situation, or initiatively looking for the event in the display unit. Thereby, the information display method in the present invention improves the convenience and adaptability of the portable device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An information display method, suitable for a portable device in a standby situation, wherein the portable device has a display unit which displays a standby layout and the standby layout comprises a main menu, the information display method comprising:

generating at least one event with an event content; and
automatically changing the standby layout to add a movable field in a visible region of the display unit, wherein the generated at least one event and at least a part of the event content of the generated at least one event are displayed in the movable field while the portable device is still in the standby situation, and a relative position between the movable field and the main menu is changed in the visible region of the display unit every time when the generated at least one event is generated.

2. The information display method according to claim 1, wherein the generated at least one event comprises a missed call, a short message, and an event reminder.

3. The information display method according to claim 1, wherein in the standby situation, a display position of the movable field is changed in the visible region of the display unit every time when the generated at least one event is generated.

4. The information display method according to claim 1, wherein the movable field comprises at least one sub field for sequentially displaying the generated at least one event according to a priority sequence.

5. The information display method according to claim 1, wherein the display unit is a touch screen.

6. The information display method according to claim 1, wherein the portable device is one of a smartphone, a personal digital assistant (PDA), a PDA phone, and a touch phone.

7. An information display method, suitable for a portable device in a standby situation, wherein the portable device has a display unit which displays a main menu for representing the standby situation, the information display method comprising:

generating at least one event with an event content; and
automatically moving the main menu within a visible region of the display unit, and generating a movable field, wherein when the main menu is moved toward one side of the visible region, and the movable field is added at the other side of the visible region, wherein the generated at least one event and at least a part of the event content of the generated at least one event are displayed in the movable field while the portable device is still in the standby situation, and in the standby situation, a relative position between the movable field and the main menu is changed in the visible region of the display unit every time when the generated at least one event is generated.

8. The information display method according to claim 7, wherein the generated at least one event comprises a missed call, a short message, and a event reminder.

9. The information display method according to claim 7, wherein in the standby situation, the movable field is moved in the visible region of the display unit every time when the generated at least one event is generated.

10. The information display method according to claim 7, wherein the movable field comprises at least one sub field for sequentially displaying the generated at least one event according to a priority sequence.

11. The information display method according to claim 7, wherein the step of moving the main menu further comprises changing a content, a shape, or a color presentation of a picture displayed by the main menu.

12. The information display method according to claim 7, wherein the display unit is a touch screen.

13. The information display method according to claim 7, wherein the portable device is one of a smartphone, a PDA, a PDA phone, and a touch phone.

* * * * *